United States Patent [19]

Bechtolsheim

[11] 4,435,792
[45] Mar. 6, 1984

[54] RASTER MEMORY MANIPULATION APPARATUS

[75] Inventor: Andreas Bechtolsheim, Stanford, Calif.

[73] Assignee: Sun Microsystems, Inc., Mountain View, Calif.

[21] Appl. No.: 393,599

[22] Filed: Jun. 30, 1982

[51] Int. Cl.³ .............................................. G11C 13/00
[52] U.S. Cl. .................................... 365/230; 365/193
[58] Field of Search ................ 365/63, 174, 182, 189, 365/193, 230, 231, 233, 234, 235

[56] References Cited

PUBLICATIONS

"High-Performance Raster Graphics for Microcomputer Systems" by Andreas Bechtolsheim, et al., Jul. 15, 1980, pp. 43–47; presented at the Special Interest Group on Graphics Conference, Association of Computing Machinery, Seattle, Washington.

Primary Examiner—Terrell W. Fears
Attorney, Agent, or Firm—Limbach, Limbach & Sutton

[57] ABSTRACT

An apparatus for manipulating and displaying raster images stored in a memory system under computer control, wherein a function unit combines new display data presented to the apparatus with display data already stored in memory, to form a new display that is stored in memory system, all in a single read/modify/write cycle.

21 Claims, 6 Drawing Figures

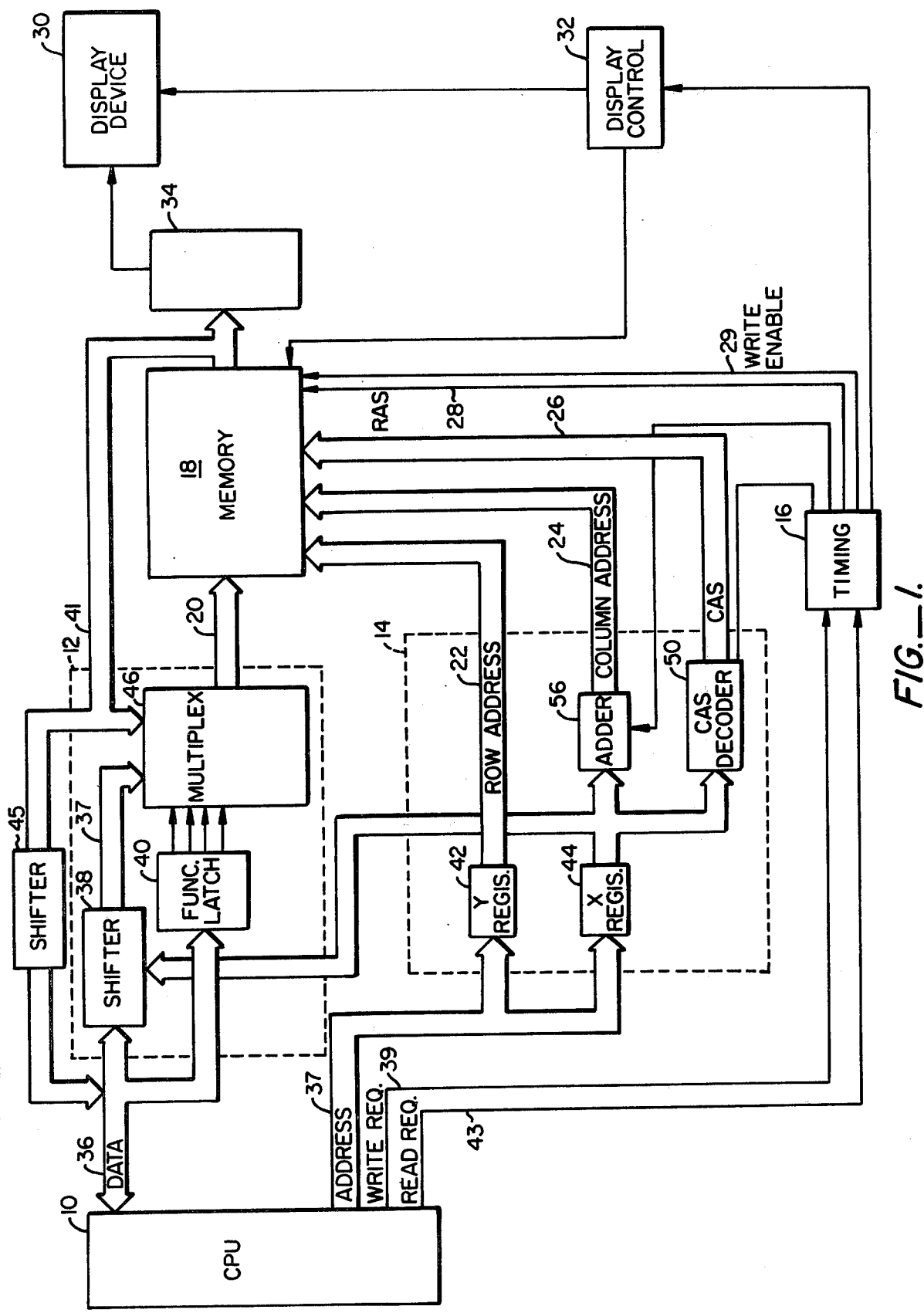
FIG._1.

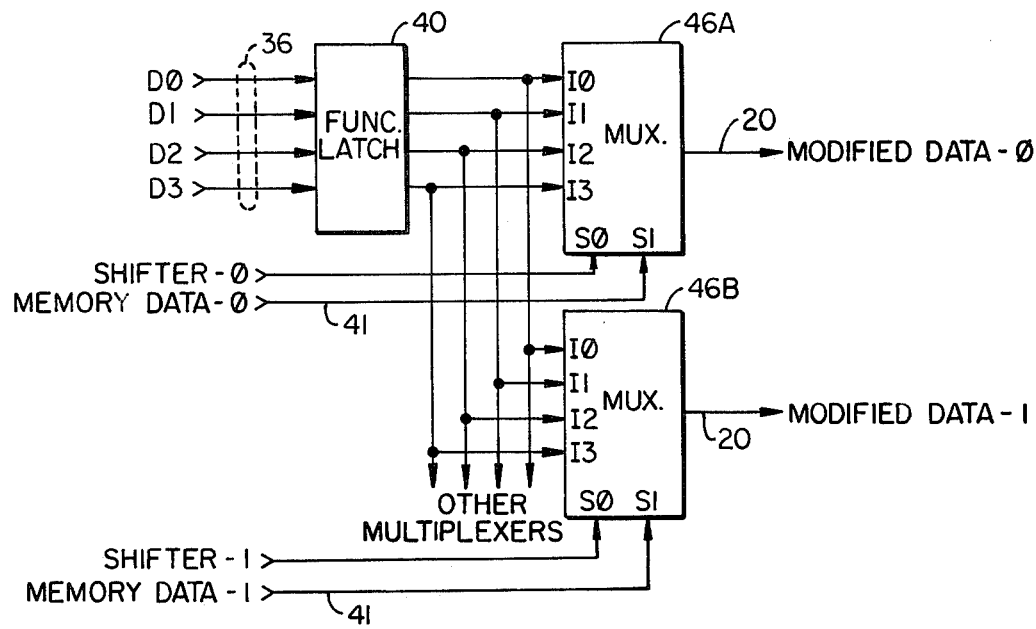
FIG._2.
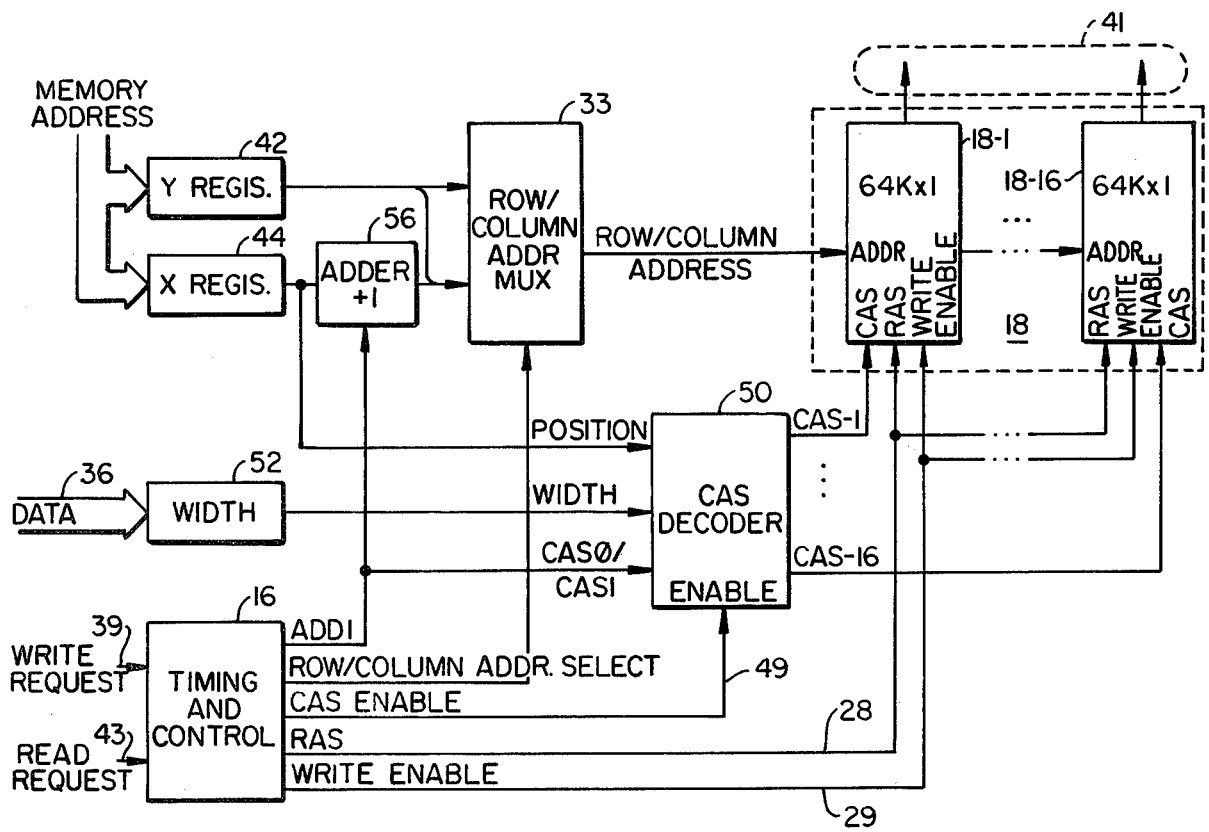
FIG._3.

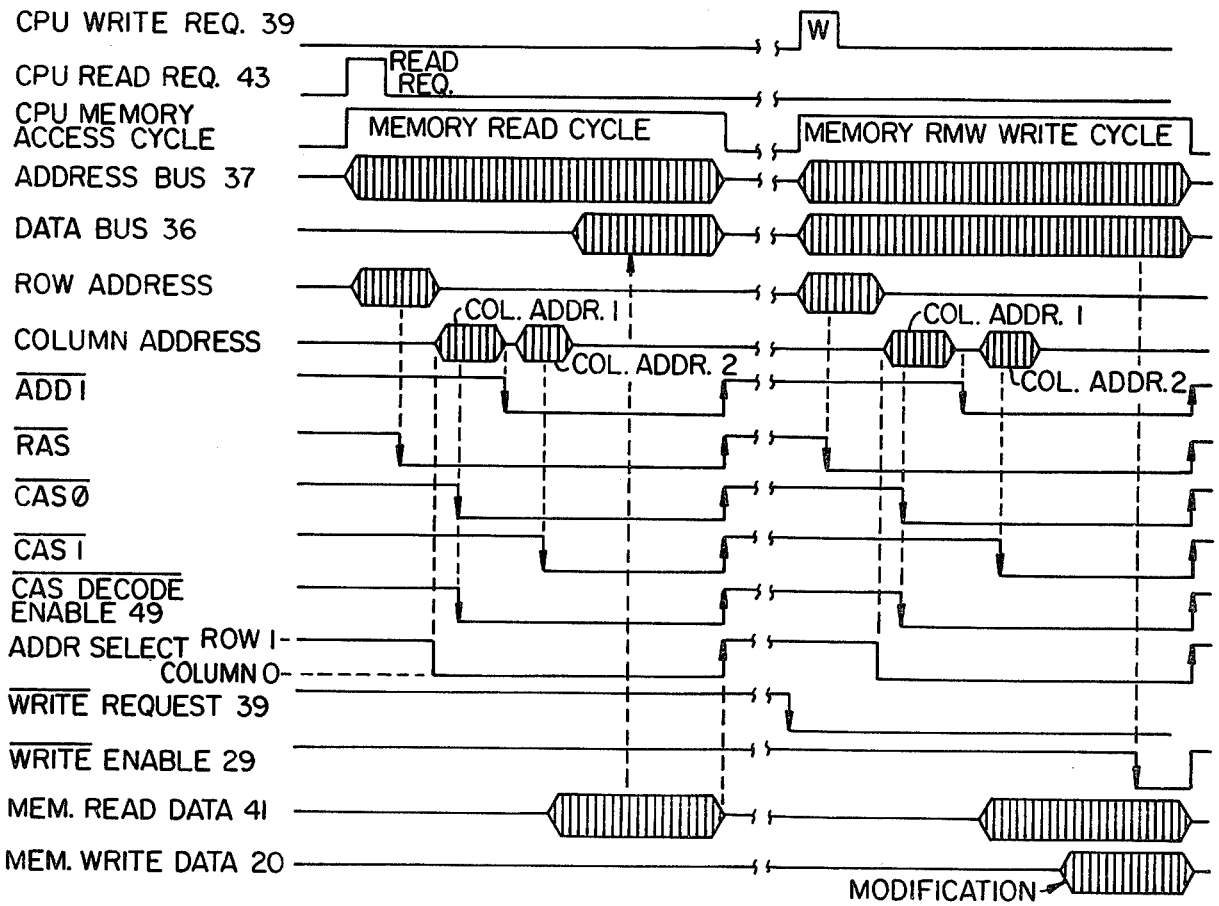
FIG._4.
FIG._5.

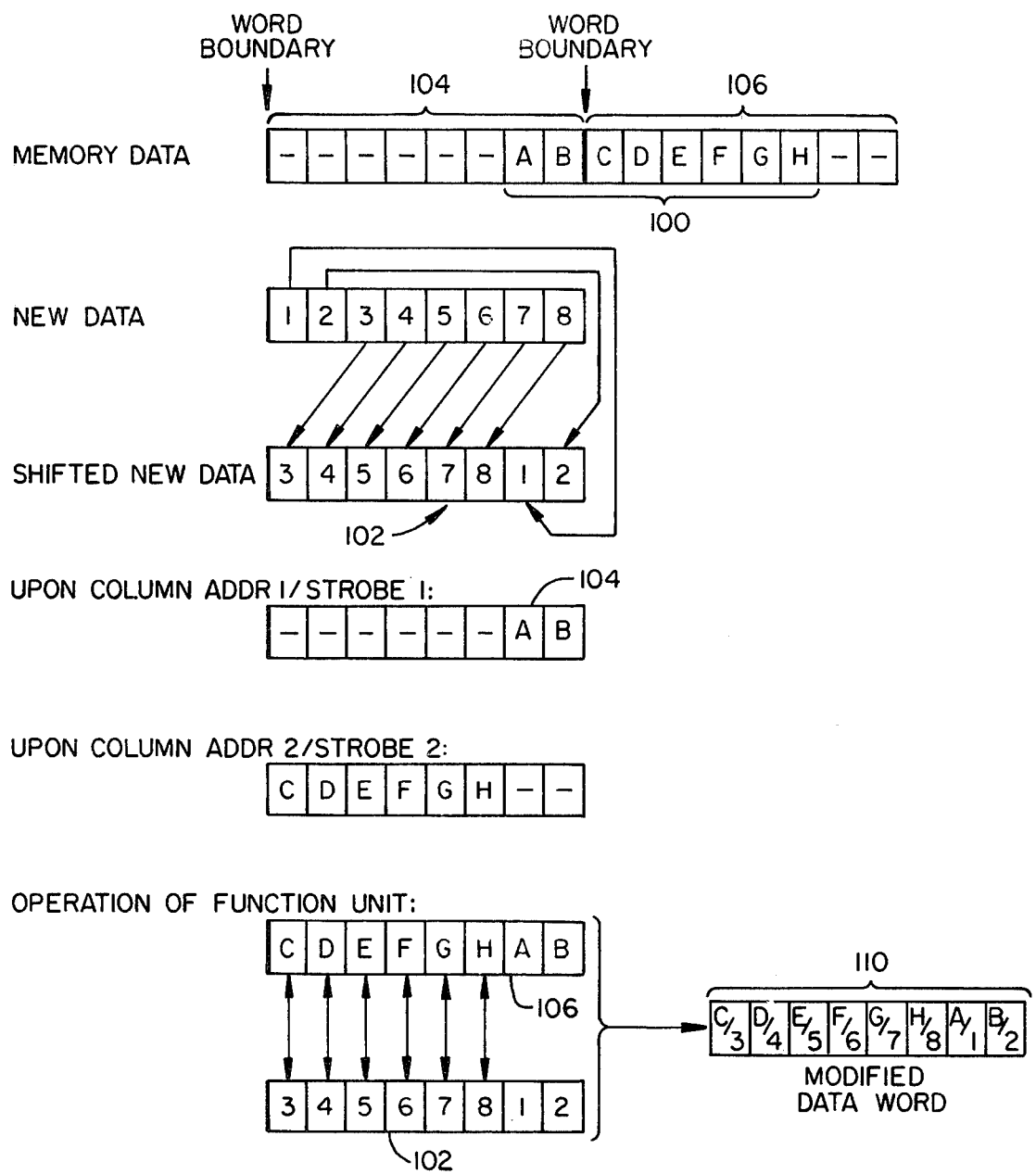
FIG._6.

RASTER MEMORY MANIPULATION APPARATUS

BACKGROUND OF THE INVENTION

The present invention relates generally to manipulation of data within a memory system and, more specifically to digital data processing of pictorial or visual information in which images are stored in digital form, manipulated, and then displayed on a display device as raster images. Data processing devices in which visual information are displayed as raster images have the flexibility to deal with a wide variety of images, including text, characters of various size and shape, graphical data such as lines, curves, and solid areas, as well as photographic images that are approximated by half tones.

Such images can be stored electronically as digital data and can be reproduced on a variety of output devices, including raster-scan display devices such as standard television cathode ray tubes, laser printers, and ink-jet printers. Thus, apparatus dealing with raster images have wide application in fields of word processing, typesetting, drafting, and computer-aided-design.

Typically, raster images are stored in a computer memory on a picture-element by picture-element basis. A memory used in this manner is also known as "bit-map memory" or "frame buffer". As the names imply, for each picture element displayed on the visual display there is a corresponding bit of data stored in the computer memory. Thus there is a one-for-one correspondence between the data contained in the computer memory and the image displayed by the visual display.

The raster display data which form the raster images are written into the computer memory or "frame buffer" under computer control. Often, this writing of information into the frame buffer employs a dedicated computer or "display processor" to generate particular raster images, such as vectors, at high speed. Under these circumstances, the display processor determines, internally, the logic state and location of data in the frame buffer necessary to provide a raster image corresponding, for example, to a vector. Once the logic states and location are decided upon, the display processor transfers this information in a series of write cycles to the frame buffer. After this transfer is completed, the image can then be displayed on the visual display device.

Where a particular raster image is to be superimposed upon or used to modify an image already contained within the frame buffer, the display processor is often required to first read the data from the frame buffer and then internally modify the data from the frame buffer to form the new image. The new image data must then be written back into the frame buffer. Under the architectures of display processors of the past, this internally generated raster image requires a substantial amount of display processor time. This in turn results in a long response time by the system in updating or generating raster images.

Frame buffers are often organized as a "dual-port-memory" in which one port provides access for the controlling computer system and the other port provides output to a suitable display device, such as a raster scan display, or a scanning printer. With the recent advances in semiconductor technology it has become increasingly economical to build large frame buffer memories achieving a high resolution picture definition. This high resolution picture definition capability further amplifies the shortcomings of past raster image storage and generation systems. As picture definition increases in resolution a substantially greater number of data bits must be processed and stored in a short period of time. The processing time of the display processor then becomes the determinative factor in the speed of the system and in the effectiveness by which the frame buffer is utilized.

The requirement for high speed raster image generation and storage is of even greater importance in so called interactive applications. In these applications an operator receives visual feedback from a frame buffer display in response to instructions which he supplies to the system. As such, it is desirable that the frame buffer memory be updated in a very short time, such as a fraction of a second. Fast raster image generation and modification is also important in laser printer systems which can print images at very high speeds. In order to fully utilize the high speed capability of such printers, it is important that the image generation and modification time be as fast or faster than the printing speed of the laser printer.

The creation of a raster image display typically involves the combining of multiple, predefined raster images, such as character shapes, into the frame buffer for storage and/or display. In the past, this process was performed with a general purpose or a special purpose computer, in software. As such, a substantial amount of computer time was required for such processing. In order to speed up such processing, more expensive high speed computers were often required. In such systems, a read cycle, an internal processing cycle, and a write cycle would be performed by the general purpose computer on the buffer memory. The actual data modification was handled by the central processing unit of the computer. Thus the speed by which the raster images were generated were a direct function of the processing time of the CPU.

It is therefore apparent that in order to provide more efficient raster image processing and storage to compliment the higher resolution picture definition capabilities of present large frame buffer memories, it is important that means be devised for faster access to the frame buffer as well as faster processing of raster image information for storage in the frame buffer.

SUMMARY OF THE INVENTION

The foregoing and other problems of prior art raster image generation and storage apparatus are overcome by the present invention of a bit wise modifiable memory apparatus in which data stored at any location within a memory can be modified within a single memory read or memory write cycle, comprising memory means for storing a plurality of binary words having a predetermined length wherein each word is stored at a location which is defined by a row and column address; function generation means, responsive to data from the memory means and data and function control signals supplied by a computer, for generating a modified set of data which is a specified function of the data and of the computer supplied data; and addressing means, responsive to row and column addresses and bit location data supplied by the computer, for generating addressing information, so that image data can be read from the memory, modified and stored back into the memory in a single read/modify/write memory cycle and wherein such data can extend over word boundaries within the memory means.

In one embodiment to the present invention the function generation means is a multiplexer which is used as a Boolean function generator by utilizing the normal control lines as data inputs and utilizing the normally data input lines as control inputs.

The ability to read, modify, and write information into the memory into arbitrary bit location during a single memory access is made possible by the addressing means which selectively provide several sets of memory strobes so that a plurality of memory words can be written into during a single write cycle or read out from memory in a single read cycle. Additionally, Ishifter means responsive to the display data and to offset data from the computer aligns the display data with the bit boundary being accessed in the memory with minimal participation by the computer. In the present invention, the computer plays no direct role in modifying the image data. Instead, the computer supplies data which is to be used in the modification, as well as sets up function control signals which specify the particular modification to be performed on the data. As such, a highly flexible, high speed raster image modification and storage apparatus is provided.

It is therefore an object of the present invention to provide an apparatus which permits high speed updating and manipulation of raster images within a frame buffer.

It is another object of the present invention to provide an apparatus in which a computer has minimal participation in the actual modification and storage of raster images within a frame buffer.

It is a further object of the present invention to provide an apparatus in which raster images spanning several frame buffer words can be accessed or modified in a single read, write or read/modify/write memory cycle.

It is another object of the present invention to permit direct access to frame buffer memory words on any bit boundary so that symbols of variable size, such as proportionally spaced characters, can be written into the frame buffer memory directly without having to further modify the positioning of such data with respect to their corresponding addressing.

It is still another object of the present invention to provide a raster image modifying and storage apparatus in which raster images are modified according to Boolean functions implemented by way of a multiplexer.

It is another object of the present invention to provide a raster image modifying and generating apparatus in which addressing is provided such that several data words within the frame buffer can be accessed during a single read or write cycle.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 1 is a functional block diagram of one embodiment of the present invention.

FIG. 2 is a functional block diagram of one implementation of the function unit of the present invention.

FIG. 3 is a functional block diagram of the addressing circuitry and the frame buffer of the present invention.

FIG. 4 is a table indicating the matter in which memory strobes are generated by the addressing circuitry for a modification width of sixteen bits.

FIG. 5 is a timing diagram which illustrates the sequence in which the various addressing signals are applied.

FIG. 6 provides an illustrative example of the alignment of new data with data from memory.

DETAILED DESCRIPTION OF THE INVENTION

Referring to FIG. 1, the general architecture of the present invention will now be described. A central processing unit (CPU) 10 supplies display data (or new data) and function specification information to function generation circuitry 12 on data bus 36. The CPU 10 also provides memory location information to addressing logic 14 on address bus 37. The CPU 10 also provides a write request to timing circuitry 16 on line 39.

The function generation unit 12 also receives data from the output of the frame buffer 18 on lines 41. This frame buffer data and the new data received from the CPU 10 are processed according to the function specification information to produce modified display data for input to the frame buffer or memory 18 via lines 20.

The modified data is stored at a location in the memory 18 which is specified by a row address on line 22, and column address on line 24, and column address strobes on line 26 and row address strobes on line 28. Addressing logic circuitry 14 supplies all of these signals except for the row address strobes.

Timing for the generation of the memory addressing is provided by timing circuit 16 in response to the write request signal from CPU 10. In the embodiment of FIG. 1, timing circuitry 16 also supplies the row address strobes and enables the column address strobes.

The raster image data in memory 18 is displayed on display device 30 in a separate raster display cycle. In this cycle, display controller 32 inhibits addressing logic circuitry 14 and then provides addressing to memory 18 so as to cause memory 18 to provide a sequential set of parallel words to register 34. In conjunction with this memory addressing, display controller 32 provides horizontal and vertical control signals to the display device 30. Register 34 then converts the parallel data from memory 18 into a serial format and supplies this serial data to the display device 30. This serial data is then displayed by display device 30 according to the control signals supplied by display controller 32.

In the memory modification cycle, the data stored at the memory location which is to be modified are read out of memory 18 during a read cycle. To do this, addressing logic circuitry 14 interprets the memory location data from CPU 10 and generates a multiplicity of addresses and address strobes which correspond to the memory locations sought to be modified. The addresses correspond to word boundaries within memory 18 while the address strobes enable specific bits within each word addressed, so that only data corresponding to those specific bits are read out of memory 18. The memory data are then supplied on lines 41 to function generation circuit 12. It should be noted that as a result of this addressing approach, the location in memory which can be accessed are bit aligned, as opposed to word aligned.

Shifter 38 is provided to shift the word aligned data 36 from CPU 10 into a bit aligned format 37 corresponding to the bit location being accessed in memory 18.

During a read cycle, timing circuit 16 supplies enable signals to addressing logic circuit 12 to control the timing by which the addresses and strobes are applied to memory 18.

The memory data 41 and the new bit aligned data 37 from CPU 10 are then processed by the function generation unit 12 according to the function specification information received from CPU 10 which has previously been latched into function latch 40. The resulting modified data is provided on line 20 to memory 18 and is then written into memory 18 as a consequence of a write request 39 from CPU 10 to timing circuitry 16. In response to this write request, timing circuitry 16 generates enable signals which are supplied to the addressing logic circuit 14 and row address strobes and a write enable signal which are supplied to memory 18.

In response to the enable signals and to the memory location data, addressing logic circuitry 14 provides the row and column addresses of the designated words which contain the memory locations to be modified by the modified data on line 20. Addressing logic circuitry 14 also provides the column address strobes in conjunction with the row address strobes, which enable the specific memory locations which are to be modified. Upon receipt of the write enable signal, on line 29, from timing circuitry 16, the modified data 20 are written into memory 18 in the specified locations. In the above manner, raster image data within memory 18 can be modified in a single CPU 10 write cycle.

As can be seen from FIG. 1, the new data and memory location information received from the CPU 10 by the function generation unit 12 and by the address logic circuit 14 are stored within registers. In the function generation unit 12 the new data from CPU 10 are stored within a shifter 38, while the functional specification information are stored in a function latch 40. In the addressing logic circuitry 14, the memory location information from CPU 10 is stored in registers 42 and 44. Thus, for consecutive operations, only those registers which change need to be reloaded; other registers simply retain their previous data.

FUNCTION GENERATION

Referring to FIGS. 1 and 2 the function generation unit 12 will be described in greater detail. Shifter 38 is provided so that the new data supplied by CPU 10 can be aligned with the data memory from memory 18. Offset data are supplied to shifter 38 as part of X address data in X register 44 to indicate the number of bits by which the data are to be shifted for proper alignment. Typically new data from CPU 10 originates from a separate memory which provides storage for character patterns or other graphic images, and other preformated image data that are aligned on a word boundary. Because the alignment of images within memory 18 can occur at any bit boundary within the memory, the new data from CPU 10 typically needs to be shifted out of the word-boundary format for proper alignment.

The shifter 38 is functionally a cyclical or wrap around register, such that data shifted from one end is reintroduced at the opposite end. For example, in an eight bit word of new data from CPU 10, where the shifter is required to align the sixth bit of the new data with the word boundary, former bits 0 through 4 will be shifted to occupy bit positions 4, 5, 6 and 7 within the word, while former bits 5, 6 and 7 will thereafter occupy bit positions 0, 1, and 2 of the word. Thus, the data bits which are shifted out of the shifter 38 during the alignment process are retained by the shifter 38 but in new bit positions.

As described above, the CPU 10 also provides function specification data to latch 40 for the function generation unit 12. The memory data, the shifted new data and the function specification information are received by multiplexer means 46. A multiplexer is typically a data selector, having a multiplicity of data input lines and a multiplicity of control lines. According to the logical state of the data on the control lines, data from a specific data input line is provided at the output of the multiplexer. In the present invention, however, the multiplexer 46 is used in a different manner. The shifted new data and the memory data are supplied to the control lines of the multiplexer 46 instead of to the data input lines. The function specification information from latch 40 are supplied to the data input lines instead of to the control lines. By this arrangement, the logical state of the function specification information on the data input lines of multiplexer 46 causes a Boolean type operation to be conducted upon the shifted new data and the memory data which are present on the control lines.

Referring to FIG. 2, the multiplexer circuit 46 is shown in greater detail. For purposes of illustration, only two of a plurality of multiplexers are shown, it being understood that the multiplexers which are not shown function in a manner substantially similar to the multiplexers shown. It is to be understood that the additional multiplexers would each handle one bit of data. In practice, the number of multiplexers used would be determined by the maximum number of bits desired to be modified in any one memory cycle.

For purposes of illustration, FIG. 2 shows multiplexers having two control lines and four data input lines apiece which provide 16 different selectable Boolean operations. It is to be understood that multiplexers having a larger number of control lines and data input lines can be utilized with satisfactory results, the difference in performance residing in the number of Boolean operations which can be generated. As can be seen from FIG. 2, function latch 40 supplies function specification information in parallel to the data input lines of each multiplexer. The four data input lines of each multiplexer are designated by I0, I1, I2, and I3.

Memory data bit 0 and bit 0 from shifter 38 are supplied to control inputs S1 and S0 respectively of multiplexer 46A. Likewise, bit 1 from shifter 38 and memory data bit 1 are supplied to control input lines S0 and S1 respectively of multiplexer 46B. The output of multiplexer 46A is supplied as modified data bit 0 to memory 18, while the output of multiplexer 46B is supplied as modified data bit 1 to memory 18. Modified data for the other bit positions are supplied in a similar manner for the multiplexers not shown.

The derivation of the Boolean operations performed upon the shifter data and the memory data is illustrated in Tables 1 and 2. In Table 1, the typical data selection application of a multiplexer is shown. Data on a specific data input line is provided as the output of the multiplexer depending upon the logic states present on the two control lines S0 and S1 of the multiplexer.

TABLE 1

| Multiplexer/Data Selector | | |
|---|---|---|
| Control Line | | |
| S1 | S0 | Output |
| 0 | 0 | I0 |
| 0 | 1 | I1 |
| 1 | 0 | I2 |
| 1 | 1 | I3 |

TABLE 2

| | Function Generation | | | | |
|---|---|---|---|---|---|
| S1 | 1 | 1 | 0 | 0 | |
| S0 | 1 | 0 | 1 | 0 | |
| DATA INPUT LINES | I3 | I2 | I1 | I0 | Function |
| | 0 | 0 | 0 | 0 | 0 |
| | 0 | 0 | 0 | 1 | $\overline{S1 \text{ OR } S0}$ |
| | 0 | 0 | 1 | 0 | $\overline{S1} \text{ AND } S0$ |
| | 0 | 0 | 1 | 1 | $\overline{S1}$ |
| | 0 | 1 | 0 | 0 | $S1 \text{ AND } \overline{S0}$ |
| | 0 | 1 | 0 | 1 | $\overline{S0}$ |
| | 0 | 1 | 1 | 0 | S1 XOR S0 |
| | 0 | 1 | 1 | 1 | $\overline{S1 \text{ AND } S0}$ |
| | 1 | 0 | 0 | 0 | S1 AND S0 |
| | 1 | 0 | 0 | 1 | $\overline{S1 \text{ XOR } S0}$ |
| | 1 | 0 | 1 | 0 | S0 |
| | 1 | 0 | 1 | 1 | $\overline{S1} \text{ OR } S0$ |
| | 1 | 1 | 0 | 0 | S1 |
| | 1 | 1 | 0 | 1 | $S1 \text{ AND } \overline{S0}$ |
| | 1 | 1 | 1 | 0 | S1 OR S0 |
| | 1 | 1 | 1 | 1 | 1 |

Table 2 illustrates the relationship between the logic states present on the control lines S0 and S1 and the logic states present on each of the data input lines I0, I1, I2 and I3. As can be seen from the Table the logic states present on the data lines, as determined by the function specification information from latch 40, indeed cause the multiplexer to provide an output which is a specified Boolean function of the logic states present on the control lines of the multiplexer.

For example, referring to the 5th entry below the "DATA INPUT LINES" line of the Table, a Boolean "AND" function is selected by the function selection information: 0001. The logic states on the data input lines I0, I1, I2 and I3 as provided by function latch 40, are 0, 0, 0, and 1 respectively. Upon examining the logic states of S0 and S1 and the logic state on the data line selected by a particular combination of S0 and S1, it can be seen that only where both S0 and S1 are at a logic 1 state will there be a logic 1 state output from the multiplexer 46. This is a Boolean AND function of S0 and S1.

From a different perspective; the function select information supplied to the multiplexer to cause a certain Boolean operation to be performed is a binary word which is selected from a set of unique binary words, with each word specifying a different Boolean function. The selected binary word is applied in parallel to the data input lines of the multiplexer, with each data line receiving one of the bits of the selected binary word.

In the present invention, the multiplexer is used to subject data supplied to the multiplexer control lines to a specified Boolean operation. In order to do this, the logic states of the bits which make up the binary word, by which the particular Boolean operation is requested, are chosen as follows: The logic state of the bit supplied to a particular data input line is chosen to equal the result of the Boolean operation upon the logic states present on the control lines, where such logic states select that particular data input line as an output. This is done for each bit of the binary word.

Thus, as illustrated in Table 2, the binary word chosen to request a Boolean "OR" function is 1110, i.e., bits 1–3 have a logic state "1" while bit $\emptyset$ has a logic state "0". Thus, data input line I$\emptyset$–I2 receive a logic state "1" and data input line I3 receives a logic state "0". Since, for an "OR" operation on logic states present on the control lines, the logic states on the control lines for an output of a logic state "1" must contain at least one "1" state. It can be seen that where both control lines are at logic state "0", the output should be a logic state "0". Therefore, since the data input line selected when both control lines are at logic state "0" is I$\emptyset$, bit $\emptyset$ of the binary word should be at logic state "0" and all others at logic state "1". The binary word chosen to request a Boolean "OR" operation is thus: 1110.

Similarly, other Boolean functions can be specified by the logic states on the data input lines from latch 40. As can be seen from Table 2, in the case where two control lines select from among four data input lines, all sixteen Boolean functions which can possibly be implemented on two variables are implemented.

Significantly, the multiplexer function unit can perform all Boolean functions for the number of control lines provided. In the case of 2 variables (control lines), there are 16 Boolean functions possible, any of which can be performed by the function unit. Similarly, in the case of three variables (control lines), there are 256 possible Boolean functions, all of which are available. Since all possible functions are provided, it is not necessary for the CPU 10 to perform any data modification. Thus, where there are three control lines and eight data lines, 256 Boolean functions can be performed upon data from three different sources. The two control lines and four data lines as used in FIG. 2 were chosen for purposes of illustration only.

In the embodiment described, new data and function specification information are received by the function generation unit 12 from CPU 10, and in response thereto modifies the data stored within memory 18. This modification includes replacing the data in memory 18 in its entirety, permitting the data to remain unchanged, or providing modified data which is a Boolean function of the old data from memory 18 and new data provided by CPU 10. Because the present invention is configured in the above described manner, there is great flexibility in the kinds of data modification that can be performed. Additionally, where the same modification is sought to be conducted on a block of data, the contents of the row or column registers 42/44 and function latch 40 can remain unchanged. This means that the CPU 10, during modification of the particular block of data, only need to provide that information which is changing. This in turn saves a substantial amount of CPU processing time.

Thus, the present invention is capable of modifying raster image data in a raster memory at high speed, with little CPU processing time required, and with a large number of different operations. The above is due in part to the use of the function generation unit 12 in a feedback type loop with the memory 18. The manner in which the addressing to memory 18 is implemented also contributes to the high speed of the invention.

Additionally, the CPU 10 can read back data from memory 18 by issuing a read request 43 to timing circuitry 16 to initiate the memory addressing described above. Data read from memory 18 is then supplied to the CPU 10 via shifter 45, where shifter 45 aligns the bit boundary data with the word boundary format required by CPU 10.

ADDRESSING LOGIC UNIT

Referring now to FIGS. 1 and 3, the address logic unit 14 and memory 18 will be described in greater detail. In one embodiment of the present invention memory 18 is a 64K-word random-access memory, where each word comprises 16 bits. In this embodiment, memory 18 comprises 16 individual 64K by one bit random access memories. Row and column addresses are provided in parallel to all of the 64K by one bit memories. In this manner, for a given row and column address, a 16 bit word is provided at the output of memory 18. Thus, the row and column address provided to memory 18 address word boundaries within memory 18.

Memory 18 also receives row address strobes and column address strobes, with each individual 64K by one bit memory receiving its own row address strobe (RAS) and its own column address (CAS). Thus, in order for a particular individual 64K by one bit memory to be responsive to a given row and column address, the memory should receive a row address strobe and a column address strobe. It can be seen that by selectively supplying row address strobes or column address strobes to specific individual 64K by one bit memories in the memory 18, selected bits within an addressed memory word can be written into or read out from while other selected bits of the same addressed word will not be written into or read out from.

In one embodiment of the present invention, a row address strobe is provided in common to all of the 64K by one bit memories in memory 18. On the other hand, column address strobes are selectively supplied to the 64K by one bit memories through CAS decoder 50. As can be seen from FIG. 3, CAS decoder 50 is supplied with an ADD1 and a CAS enable signal from timing circuit 16, with width data from width register 52, and with X data from X register 44. As discussed above the CPU 10 provides memory location information to Y register 42 and X register 44 via address bus 37. In one embodiment of the present invention, the data contained in Y register 42 includes all of the column address of the addressed location in memory 18 as well as a portion of the row address of the addressed location in memory 18. The X register 44 contains the other portion of the row address, as well as offset data. This offset data indicates at what bit within the addressed word the data to be modified begins. The contents of width register 52 are supplied through data bus 36 and specify the length of the contiguous data string which is to be modified in memory 18. In one embodiment of the present invention, a row address/column address multiplexer 54 is employed to control the application of the row or the column address to the memory 18 in conjunction with a row/column address select signal.

In one embodiment of the present invention Y register 42 and X register 44 each contain ten bits of data. Eight bits from the Y register 42 are used directly as the row address while the remaining two bits are combined with six bits from the X register 44 to form a column address. The remaining four bits from X register 44 are provided to the CAS decoder 50 to indicate the specific bit position within the addressed word at which point the data to be modified is located. As can be seen from FIG. 3, the row address is supplied directly to multiplexer 54. The two bits from the Y register 42, which form a portion of the column address, are also provided directly to multiplexer 54. The remaining six bits of the column address, which originate from the X register are supplied to the multiplexer 54 through a "plus one" adder 56. The six most significant bits from the X register 44 provide the six least significant bits of the column address while the two bits from the Y register 42 provide the two most significant bits of the column address.

In the above configuration, adder 56 can increment the six least significant bits of the column address by one upon the application of an ADD1 signal from timing circuit 16. Thus, the column address for two adjacent words can be provided by the above configuration. The address of the first word would comprise the row address from Y register and a column address from the two bits of Y register 42 and the six bits of X register 44, wherein the six bits from X register 44 are passed through adder 56 unchanged. The address of the second adjacent word would comprise the row address from Y register 42 and a column address consisting of the two bits from Y register 42 and the six bits from X register 44 which have been incremented by one by the adder 56. It is to be understood that adder 56 can be a programmable adder such that any number of different column addresses can be generated by the above arrangement.

Multiplexer 54 then provides either a row or a column address to memory 18 as a function of the row/column address select signal from timing circuit 16.

As described above, four bits from X register 44 are supplied to CAS decoder 50. These four bits indicate the location within the addressed word of memory 18 at which the data to be changed starts. These four bits are also supplied to shifter 38 to specify the amount of offset by which the new data from the CPU should be shifted.

In the preferred embodiment of the present invention a word is defined as being 16 bits long. Therefore these four bits indicate at which of the 16 bits in the word addressed particular modification operation is a start. It is to be understood that, while a memory word of 16 bits in length has been selected here, other word lengths are equally usable in this invention. Thus, for example, where a 32 bit word length is selected, 5 bits should be supplied in conjunction with the addressing in order to specify at which of the 32 bits in the 32 bit word the modification operation is to start.

For purposes of illustration, FIG. 4 demonstrates the generation of column address strobes (CAS) as a function of the four bits of data supplied to the CAS decoder 50 from X register 44.

Recall that by applying a CAS and a row address strobe (RAS) to a particular one of the 64K by one bit memories of memory 18, the particular memory is made responsive to the row and column addressing.

In FIG. 4 these four bits of binary data are listed in their decimal equivalent in the X column. X can be considered to be the offset from the word location in memory. Within FIG. 4, a "one" stands for a column address strobe which will be issued by CAS Decoder 50 in conjunction with the first column address provided by X register 44, adder 56, and multiplexer 54. The "two's" indicate the column address strobes which will be supplied in conjunction with the second column address supplied by X register 44, adder 56, and multiplexer 54. In one embodiment the CAS Decoder 50 is implemented as read only memory (ROM).

For example, if no offset was specified by the four bits of offset information supplied to CAS Decoder 50, all sixteen column address strobes would be supplied in conjunction with the first column address, and no column address strobes would be supplied in conjunction with the second column address. Conversely, if the offset specified corresponded to 11 bits, then column address strobes for the last five bits of the first word addressed would be supplied in conjunction with the first column address, while column address strobes corresponding to the first 11 bits of the data word will be issued in conjunction with the second column address issued. It is to be noted that the generation of the first and second column addresses occur within a single read or a single write cycle.

From FIG. 3 it can be seen that the ADD1 signal from timing circuit 16 is also supplied to CAS Decoder 50. By this signal, CAS Decoder 50 is instructed to issue either the first or second set of column address strobes.

FIG. 5 is a timing chart which illustrates the sequence in which the various signals discussed above arise. The first line of the chart represents the sequence of events for a CPU read cycle and a CPU write cycle. Memory location data are supplied on the address bus 37 and new data and offset information are supplied on the data bus 36 by the CPU 10 at the beginning of the memory cycle. The row address enable signal to row/column address multiplexer 33 is first asserted by the timing circuit 16, followed by the column address enable signal. For purposes of illustration, the row address enable is represented by a logic 1 state and the column address enable is represented by a logic 0 state. In conjunction with the row address enable signal, the timing circuit 16 also asserts the row address strobe (RAS). In conjunction with the column address enable signal, the timing circuit asserts the CAS enable line 49, followed by the ADD1 line.

In response to the CAS enable signal, the CAS Decoder 50 outputs the first set of column address strobes. When the ADD1 line is asserted, Adder 56 increments the column address by 1 and CAS Decoder 50 outputs the second set of column address strobes. Upon receipt of the column address strobe signals, memory 18 provides memory data from the addressed and strobed locations to function generation unit 12.

After the function generation unit 12 has operated upon the memory data and upon the new data to produce the modified data, timing circuitry 16 initiates a memory write enable 29 in order to write the modified data into memory 18 to cause the modified data to be stored at the addressed and strobed locations.

Thus, it can be seen that the present invention can generate a number of different addresses within a single read or write cycle of the CPU, thereby permitting data to be accessed in memory 18 in segments which extend beyond a word boundary.

MODIFICATION OF ADJACENT WORDS IN A SINGLE READ/MODIFY/WRITE CYCLE

The use of the function generation unit 12 in a feedback loop with memory 18, as described above, and the use of selective application of the column address strobes in conjunction with memory addressing, provide a simple but expedient means for modifying locations in memory which straddle word boundaries. Due to the selective application of column address strobes during the read cycle, the memory data are read from memory 18 in their actual bit positions. The selective application of the column address strobes during the write cycle permit the modified data to be written back into memory without modification of the other bit positions.

For example, see FIG. 6. Assume that the location 100 which is sought to be modified includes the last two bits of one word and the first six bits of the next word. Assume also that the CPU 10 supplies new data which is word-boundary aligned and specifies a particular Boolean function. The shifter 38, FIG. 1, would be instructed by the offset data to shift the new data to align the third bit of the new data with the word boundary. Additionally, the first and second bits of the new data, which are displaced, would be stored as the last two bits in the shifter 38. See block 102. The CPU 10 would also supply to function latch 40 the function specification data word which requests the desired Boolean operation.

The addressing logic circuitry 14 supplies a row address and a first column address which define the location of a first word in memory 18. The row address strobe and the first set of column address strobes are then supplied so that the contents of only the last two bits of the first word are addressed, block 104.

Similarly, when the second column address and the second set of column address strobes are applied to memory 18, only the first six bits of the next word will be accessed. However, after the memory access time memory data, as supplied to function generation unit 12, comprises a word in which the last two bits have column address 1 and the first six bits have column address 2. The full data word 104 is then operated upon in the function generation unit 12, so that the shifted new data 102 and the memory data 104 are operated upon bit-position by bit-position. The resulting modified data word is then written into memory 18 upon application of write enable signal 29.

In the above manner, memory locations which straddle word boundaries can be easily and quickly modified. Because of the addressing of the two adjacent words with multiple column addresses and column address strobes, the above described memory modifications can be accomplished in a single memory read/modify/write cycle.

In one embodiment of the present invention, memory locations up to 16 bits in width can be modified in any one read/modify/write cycle. It is to be understood that, while a width of 16 was chosen for this particular embodiment, other widths can be accommodated by the present invention. In doing so, the size of the CAS Decoder 50, the structure of the memory 18, and the offset information provided by the addressing from CPU 10 should be modified proportionately.

In a further embodiment of the present invention, width data is supplied from the data bus 36 of CPU 10 to width register 52. See FIG. 3. This width data is provided by width register 52 to CAS Decoder 50. CAS Decoder 50 utilizes this width information to modify the number of strobes issued for the first and second column address in any memory cycle so that a memory location which is less than the maximum modifiable width can be modified. For example, if the width information designated that only four bits would be changed, at an offset of 14 bits, column address strobes for only the 15th and 16th bits would be issued in conjunction with the first column address, while column address strobes for only the first and second bits would be issued in conjunction with the second column address. In this manner, consecutive memory locations of varying widths can be modified in a single read/modify/write cycle.

In the embodiment described above, all of the 64K by 1 bit memories in memory 18 are provided with the same row address strobe. This row address strobe is provided by timing circuit 16 as indicated in FIG. 3.

In operation, function specification data are first supplied to the function generation unit 12, then memory location data and new data are supplied from CPU 10 to the addressing logic circuit 14. Addressing logic circuit 14 then generates the row address, and the first and second column addresses along with the two sets of column address strobes. This address and strobe information are then applied to memory 18. In response to this addressing, memory 18 outputs the data presently contained at the addressed locations. This data is then supplied to function generation unit 12. In conjunction with the generation of the row and column addresses by addressing logic circuit 14, an offset amount is supplied to shifter 38. This causes the data from CPU 10 to be shifted a correct amount of bits so as to be aligned with the data arriving from memory 18.

In response to the function select data from function register 40, multiplexer 46 implements a Boolean operation upon the new data and the data from memory 18 to produce a modified set of data which is then supplied to memory 18. After this modification operation is completed, the timing circuit 16 causes the modified data to be written into the specified location.

In the above manner, data within memory 18 can be manipulated and modified in segments which span word boundaries within memory 18 wherein such modification can occur within a single read/modify/write cycle. Manipulation of memory in this manner provides an apparatus which can handle modifications to raster image data at a high speed. As a result, high speed display devices such as laser printers, can be used to their greatest efficiency.

The terms and expressions which have been employed here are used as terms of description and not of limitation, and there is no intention, in the use of such terms and expressions of excluding equivalents of the features shown and described, or portions thereof, it being recognized that various modifications are possible within the scope of the invention claimed.

What is claimed is:

1. A memory apparatus for use in computer controlled display systems, which is responsive to memory location data and display data supplied by the computer during a memory access cycle, comprising memory means for storing the display data, wherein the stored display data are arranged in a plurality of groups of bit locations which form a bit map and in which each group of locations is designated by a row and column address and further wherein bit locations within each designated group are enabled for access by row and column address strobes applied during the memory access cycle; and addressing means coupled to the memory means and responsive to the memory location data for sequentially generating a plurality of row and column addresses and a plurality of row and column address strobes during each memory access cycle, which strobes are specified by the memory location data and correlated to the plurality of row and column addresses, so that specified bit locations in a plurality of groups of bit locations can be accessed during the memory access cycle to permit any desired portion of the bit map to be accessed during a single memory access cycle.

2. The apparatus of claim 1 wherein the computer issues a write request in order to initiate a memory access cycle, and furtherwherein the addressing means include means for converting the memory location data into the plurality of row and column addresses and the plurality of row and column address strobes; and timing means, responsive to the write request, for controlling the sequence in which each of the plurality of row and column addresses and row and column address strobes are generated and applied to the memory means, so that the desired portion of the bit map can be modified in a single memory access cycle.

3. The apparatus of claim 2 wherein the computer issues a read request to initiate a memory access cycle, and furtherwherein, the addressing means include means for converting the memory location data into the plurality of row and column addresses and the plurality of row and column address strobes; and timing means responsive to the write request for controlling the sequence in which each of the plurality of row and column addresses and row and column address strobes are generated and applied to the memory means, so that the desired portion of the bit map can be read in a single memory access cycle.

4. The apparatus of claim 2, wherein the memory means comprise a plurality of random access memories each of which provide one bit location for each row and column address and each of which receive the plurality of row and column addresses in parallel and the row address strobes in common, and further wherein the addressing means selectively apply the column address strobes to ones of the plurality of random access memories so that a bit of data can be stored in each random access memory which receives a column address strobe.

5. The apparatus of claim 4 wherein the converting means supply to designated ones of the random access memories column address strobes in a first set of address strobes which are correlated to a first set of rows and column addresses and supply to different designated ones of the random access memories column address strobes in a second set of column address strobes which are correlated to a second set of row and column addresses.

6. The apparatus of claim 5 wherein the first and second sets of column address strobes are supplied to the random access memories in conjunction with the first and second set of row and column addresses consecutively and within a single memory access cycle.

7. The apparatus of claim 6 wherein the memory location data includes the row and column address of the group of bit locations which contains the location at which the portion of the bit map to be modified begins, and an offset quantity which is the number of bits by which the starting location is offset from the group address, and furtherwherein the addressing means comprise means for extracting the row and column address from the word address and for producing a first column address which is identical to the column address;

incrementing means responsive to the column address and to the timing means for incrementing the column address to the next consecutive column address to produce a second column address; and decoder means, responsive to the offset quantity, for generating the first and second sets of column address strobes, so that upon application of the first set of column address strobes, only those random access memories which contain bit locations within the bit map portion to be modified are accessed, and so that upon application of the second set of column address strobes only those random access memories addressed by the second column address and having bit locations within the memory portion to be modified, are accessed.

8. The apparatus of claim 7 wherein the decoder means comprise a read only memory which is addressed by the offset quantity.

9. The apparatus of claim 7 wherein the incrementing means is a binary adder.

10. The apparatus of claim 7 wherein the memory address further includes width data which is indicative of the width of the bit map portion to be modified and further wherein the decoder means are further responsive to the width data so that the quantity of the column address strobes in the first and second sets of address strobes are varied so that the portions of the memory means which are modified are variable in width.

11. The apparatus of claim 1 in which the computer supplies function specification data, further including function generating means, responsive to the binary data and to the function specification data from the computer and to the bit map data in the memory means, for performing a specified Boolean operation upon the bit map data and the binary data, wherein the Boolean operation is specified by the function specification data.

12. The apparatus of claim 11 wherein the function generating means comprise multiplexer means having a plurality of data input lines and a plurality of control lines, wherein the binary data are applied to one of the plurality of control lines and the stored binary data are applied to another of the plurality of control lines, and furtherwherein each data line receives a different one of the bits of the function specification data, so that the output of the multiplexer means takes the form of the binary and bit map data which have been operated upon by a Boolean function which is specified by the function specification data.

13. The apparatus of claim 3, wherein the memory location data includes alignment data, further including shifter means responsive to the display data and to the alignment data for aligning the display data with the bit locations being addressed.

14. The apparatus of claim 1, further including an output device responsive to the bit map data for displaying the bit map data.

15. The apparatus of claim 14, wherein the output device is a raster scan display.

16. The apparatus of claim 14, wherein the output device is a laser printer.

17. A bit-wise modifiable memory apparatus for use in computer controlled display systems in which a computer supplies display data, memory location data and function control signals, for storing the display data and for modifying the stored data and in which a display device receives the stored data for display, the apparatus comprising memory means for storing a plurality of binary words having a predetermined length, each word being stored at a location which is defined by a row and column address, wherein data are stored during a write cycle memory access and the stored data are read out during a read cycle memory access and further wherein row and column address strobes enable the memory to store data at specific bits within the word addressed;

multiplexer means, responsive to the display data, to the stored data, and to the function control signals, wherein the multiplexer has a plurality of data input lines and a plurality of control lines, and further wherein the function control signals are applied to the plurality of data lines, and the display data and the stored data are applied to the plurality of control lines, for providing modified data which result from a selected Boolean operation upon the display data and the stored data, the selected Boolean function being specified by the function control signals; and addressing means, responsive to the memory location data, for providing the row address and a first and second column address which specify the location of the words being modified, and for providing the row address strobe and a first and second set of column address strobes for enabling the bits within the addressed words which are to be modified, wherein the first column address is generated simultaneously with the first set of column address strobes, and the second column address is generated simultaneously with the second set of column address strobes, all during a single memory access cycle, so that at least two words of data can be accessed and modified in the single memory access cycle.

18. A Boolean modifiable memory apparatus in which data stored within memory are modified in accordance with input data and function data, comprising memory means for supplying stored data from a specified location during a memory read cycle and responsive to modified data for storing modified data at a specified location during a memory write cycle; and multiplexer means, responsive to the modified data supplied from the memory means, to the input data, and to the function data, for supplying the modified data to the memory means for storage, wherein the multiplexer means have a plurality of data lines and a plurality of control lines and are operable to supply, as an output, data which are present on one of the plurality of data lines, in accordance with the combination of data present on the plurality of control lines, and furtherwherein the function data are supplied to the data lines of the multiplexer means, the stored data are applied to ones of the plurality of control lines, and the input data are supplied to different ones of the plurality of control lines, so that the output of the multiplexer means corresponds to a Boolean function of the stored data and the input data, the Boolean function being specified by the function data;

whereby the stored data and the input data are supplied to the control lines and the function data are supplied to the data lines all during the memory read cycle, and the modified data, which is the result of the specified Boolean operation upon the stored data and input data, are supplied to the memory means for storage during the memory write cycle.

19. The apparatus of claim 18 in which the stored data are output by the memory means and the input data are each supplied in a parallel word format having a first predetermined number of bits, wherein the multiplexer means comprise a plurality of data selectors equal in number to the first predetermined number, each data selector having a second predetermined number of control lines and a third predetermined number of data lines, and further wherein one control line of each data selector receives one bit from the stored data word and another control line of each data selector receives one bit from the input data word, with each data selector receiving different bits of the input data word and the stored data word; and wherein all data selectors receive the same function data on their data lines.

20. The apparatus of claim 19 wherein there are sixteen data selectors, each data selector having two control lines and four data lines, and further wherein the input data and the stored data are formatted in parallel sixteen-bit words.

21. The apparatus of claim 19 wherein the data selectors are multiplexers.

* * * * *